US009141777B2

(12) United States Patent
Sun et al.

(10) Patent No.: US 9,141,777 B2
(45) Date of Patent: Sep. 22, 2015

(54) AUTHENTICATION METHOD AND CODE SETTING METHOD AND AUTHENTICATION SYSTEM FOR ELECTRONIC APPARATUS

(71) Applicant: INDUSTRIAL TECHNOLOGY RESEARCH INSTITUTE, Hsinchu (TW)

(72) Inventors: Hung-Min Sun, Hsinchu (TW); Chi-Ming Li, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 154 days.

(21) Appl. No.: 13/944,385

(22) Filed: Jul. 17, 2013

(65) Prior Publication Data
US 2014/0059674 A1 Feb. 27, 2014

(30) Foreign Application Priority Data
Aug. 24, 2012 (TW) .............................. 101130813 A

(51) Int. Cl.
G06F 21/44 (2013.01)
G06F 21/31 (2013.01)

(52) U.S. Cl.
CPC ................ *G06F 21/31* (2013.01); *G06F 21/44* (2013.01); *G06F 2221/2111* (2013.01)

(58) Field of Classification Search
CPC ......... G06F 3/033; G06F 21/44; G06F 21/83; H04L 9/32; H04W 52/0254; H04W 12/06; H04W 12/08; G06Q 30/0269
See application file for complete search history.

(56) References Cited

U.S. PATENT DOCUMENTS 7,593,000 B1 9/2009 Chin
7,930,428 B2 4/2011 Drako
(Continued)

FOREIGN PATENT DOCUMENTS

CN 102244699 A 11/2011
EP 1361728 A2 11/2003
(Continued)

OTHER PUBLICATIONS

Intellectual Property Office, Ministry of Economic Affairs, R.O.C., "Office Action", Jul. 14, 2014, Taiwan.

*Primary Examiner* — Eleni Shiferaw
*Assistant Examiner* — Paul Callahan
(74) *Attorney, Agent, or Firm* — Locke Lord LLP; Tim Tingkang Xia, Esq.

(57) ABSTRACT

The present invention relates to an authentication method for electronic apparatus and authentication system, which comprises the steps of: enabling an electronic apparatus to be moved by a user from a first position to a second position; enabling an inertial sensor embedded in the electronic apparatus to detect and thus constructing a three-dimensional continuous trajectory of the electronic apparatus's movement from the first position to the second position in a Cartesian coordinate system composed of a first-direction axis, a second-direction axis and a third-direction axis; and enabling a processor embedded in the electronic apparatus to perform either a process for registering the three-dimensional continuous trajectory as a standard movement trajectory; or a comparison between the three-dimensional continuous trajectory and a previously registered standard movement trajectory so as to authenticate the correctness of the three-dimensional continuous trajectory and thus authenticating the electronic apparatus.

15 Claims, 10 Drawing Sheets

(56) References Cited

U.S. PATENT DOCUMENTS

| | | |
|---|---|---|
| 7,986,917 B2 | 7/2011 | Ahlgren et al. |
| 8,004,501 B2 | 8/2011 | Harrison |
| 8,120,575 B2 | 2/2012 | Huang et al. |
| 8,122,384 B2 | 2/2012 | Partridge et al. |
| 8,136,053 B1 | 3/2012 | Miller et al. |
| 8,174,503 B2 | 5/2012 | Chin |
| 2007/0152961 A1 | 7/2007 | Dunton et al. |
| 2008/0020733 A1* | 1/2008 | Wassingbo .................... 455/411 |
| 2008/0220752 A1 | 9/2008 | Forstall et al. |
| 2009/0051648 A1 | 2/2009 | Shamaie et al. |
| 2009/0289916 A1 | 11/2009 | Dai |
| 2009/0320123 A1* | 12/2009 | Yu et al. .......................... 726/16 |
| 2010/0099394 A1 | 4/2010 | Hainzl |
| 2011/0159850 A1 | 6/2011 | Faith et al. |
| 2011/0283241 A1 | 11/2011 | Miller et al. |
| 2011/0296356 A1 | 12/2011 | Chaudhri et al. |
| 2012/0007713 A1 | 1/2012 | Nasiri et al. |
| 2012/0231849 A1* | 9/2012 | Yamashita .................... 455/566 |

FOREIGN PATENT DOCUMENTS

| | | |
|---|---|---|
| EP | 2251811 A1 | 11/2010 |
| TW | 200529622 | 9/2005 |
| TW | 200536327 | 11/2005 |
| TW | 201003453 A | 1/2010 |
| TW | 20107468 A | 5/2010 |
| TW | 201101234 A | 1/2011 |
| TW | 201137658 A | 11/2011 |
| TW | 201141155 A | 11/2011 |
| TW | 201229815 A | 7/2012 |

* cited by examiner

80

82 — enabling an electronic apparatus to be moved by a user from a first position to a second position 84 — enabling an inertial sensor of the electronic apparatus to detect the moving of the electronic apparatus from the first position to the second position and thus construct a three-dimensional continuous trajectory of the electronic apparatus's movement in a Cartesian coordination system composed of a first-direction axis, a second-second axis and a third-direction axis as the three-dimensional continuous trajectory is composed of a plurality of trails oriented parallel respectively to the first-direction axis, the second-second axis or the third-direction axis 86 — enabling a processor of the electronic apparatus to perform a comparison between the three-dimensional continuous trajectory and a previously registered standard movement trajectory so as to authenticate the correctness of the three-dimensional continuous trajectory and thus authenticate the electronic apparatus

92 — enabling an electronic apparatus to be moved by a user from a first position to a second position 94 — enabling an inertial sensor of the electronic apparatus to detect the moving of the electronic apparatus from the first position to the second position and thus construct a three-dimensional continuous trajectory of the electronic apparatus's movement in a Cartesian coordination system composed of a first-direction axis, a second-second axis and a third-direction axis as the three-dimensional continuous trajectory is composed of a plurality of trails oriented parallel respectively to the first-direction axis, the second-second axis or the third-direction axis 96 — enabling a processor of the electronic apparatus to perform a process for registering the three-dimensional continuous trajectory in the electronic apparatus so as to be used as a standard movement trajectory

FIG. 13

AUTHENTICATION METHOD AND CODE SETTING METHOD AND AUTHENTICATION SYSTEM FOR ELECTRONIC APPARATUS

CROSS REFERENCE TO RELATED APPLICATION

The present application is based on, and claims priority from, Taiwan (International) Application Serial Number 101130813, filed on Aug. 24, 2012, the disclosure of which is hereby incorporated by reference herein in its entirety.

TECHNICAL FIELD

The present disclosure relates to an authentication system capable of identifying the three-dimensional continuous trajectory of an electronic apparatus's movement so as to be used as a password verification base for authenticating the electronic apparatus.

BACKGROUND

With rapid advance of technology, there are more and more types of mobile devices becoming available on the market. It seems like only years ago the devices that can generally be referred as mobile devices only include personal digital assistants and cellular phones. But today, recent development in mobile collaboration system had provided us with a variety of mobile devices, such as smart phones and tablet computers. Smart phones are among the most preferred mobile devices, which offer all the conveniences of a personal computer, along with a very small form factor. For instance, using a smart phone, a user is able to download and install an application from App Store, web surfing, on-line shopping, share information via social networking sites, check e-mails, play video games, and so on. Regardless all the conveniences that can be provided by smart phones, the use of smart phone can relatively create certain security risks to our privacy, especially when the smart phones of today are becoming more powerful for allowing more personal information to be registered in the smart phones. Comparing with conventional computing devices, smart phones are selected to be used by more and more users as pocket notebooks for storing sensitive personal information, such as personal details, personal address list, personal data shared on social networking sites, personal account for network transaction, information relating the exact where about of the smart phone user, document stored in the smart phone, and so on.

There are already many means available for protecting your personal information and prevent others from using your smart phone without your permission. One common general-purpose online access control mechanism is the screen lock, which can either be a PIN, a passphrase, or an Android pattern, and is to be used for keeping safe all the sensitive documents, passwords, and other credentials stored in a smart phone when such smart phone is lost or stolen. Currently, the PIN screen lock and the Android pattern screen lock are most commonly used in smart phones, whereas comparatively the Android pattern is preferred since Android pattern is easier to remember and input than PIN is. Nevertheless, those conventional screen locks are still very vulnerable to "smudge attack", "shoulder surfing attack", or even simply spying when a screen lock of weak password strength is used.

Taking an Android pattern screen lock for example, using which a user will be asked to draw or swipe a specified pattern on touch screen to unlock his/her phone. However, by doing so, your fingers will leave a grease trail on the touch screen, and thus any person with malicious intent can photograph the touch screen and process the captured image using a simple image processing software so as to obtain the Android pattern screen lock. For preventing the aforesaid smudge attack, instead of the touch screen, a camera mounted on a smart phone is used for detecting the moving trajectory of a user's hand that is drawing a specific pattern in air so as to input the Android pattern screen lock without leaving a grease trail. However, the drawing of an Android pattern screen lock on air, or the swiping of an Android pattern screen lock on a touch screen, or even the typing of a password can all be easily captured by any person with malicious intent either by watching or by photographing, and thereby, after cracking the screen lock, any data in your smart phone is accessible to the malicious person. Moreover, since the draw of an Android pattern screen lock is restricted by connecting the dots on the screen serially and sequentially from one dot to only its neighboring dot without double tapping on the same dot, and also since the detecting of a user's hand movement can only result a two-dimensional trajectory on a planar surface, thus the password strength of such Android pattern screen lock is weak that it can be cracked easily, and thus the overall risk to a security breach using such Android pattern screen lock is not satisfactory.

SUMMARY

The present disclosure provides an authentication method and code setting method for an electronic apparatus and an authentication system of the same that are designed with sufficient password strength and capable of resisting smudge attack and shoulder surfing attack for effectively protecting sensitive information storing in smart phones from being accessed by any person with malicious intent. Moreover, the aforesaid authentication system not only can be adopted and used as the screen locks for smart phones, but also it can be adapted for login authentication of different service system, such as the login authentication of a website or the login authentication of an operation system, etc.

In an exemplary embodiment, the present disclosure provides an authentication method for electronic apparatuses, which comprises the steps of: enabling an electronic apparatus to be moved by a user from a first position to a second position; enabling an inertial sensor of the electronic apparatus to detect the moving of the electronic apparatus from the first position to the second position and thus constructing a three-dimensional continuous trajectory of the electronic apparatus's movement in a Cartesian coordination system composed of a first-direction axis, a second-direction axis and a third-direction axis as the three-dimensional continuous trajectory is composed of a plurality of trails oriented parallel respectively to the first-direction axis, the second-direction axis or the third-direction axis; and enabling a processor of the electronic apparatus to perform a comparison between the three-dimensional continuous trajectory and a previously registered standard movement trajectory so as to authenticate the correctness of the three-dimensional continuous trajectory and thus authenticating the electronic apparatus.

In another exemplary embodiment, the present disclosure provides a code setting method, which comprises the steps of: enabling an electronic apparatus to be moved by a user from a first position to a second position; enabling an inertial sensor of the electronic apparatus to detect the moving of the electronic apparatus from the first position to the second position and thus constructing a three-dimensional continuous trajectory of the electronic apparatus's movement in a Cartesian coordination system composed of a first-direction axis, a second-direction axis and a third-direction axis as the three-dimensional continuous trajectory is composed of a plurality of trails oriented parallel respectively to the first-direction axis, the second-direction axis or the third-direction axis; and enabling a processor of the electronic apparatus to perform a process for registering the three-dimensional continuous trajectory in the electronic apparatus so as to be used as a standard movement trajectory.

In further another exemplary embodiment, the present disclosure provides an authentication system for electronic apparatuses, which comprises: a frame, provided to be held by a user for allowing the user to move the electronic apparatus form a first position to a second position; an inertial sensor, for detecting the moving of the electronic apparatus from the first position to the second position and thus constructing a three-dimensional continuous trajectory of the electronic apparatus's movement in a Cartesian coordinate system composed of a first-direction axis, a second-direction axis and a third-direction axis as the three-dimensional continuous trajectory is composed of a plurality of trails oriented parallel respectively to the first-direction axis, the second-direction axis or the third-direction axis; and a processor, for processing the three-dimensional continuous trajectory so as to determine the correctness of the three-dimensional continuous trajectory.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 12 is a flow chart depicting the steps performed in an authentication method for electronic apparatuses according to an embodiment of the present disclosure.

FIG. 13 is a flow chart depicting the steps performed in a code setting method for electronic apparatuses according to an embodiment of the present disclosure.

DETAILED DESCRIPTION

Figure 1:
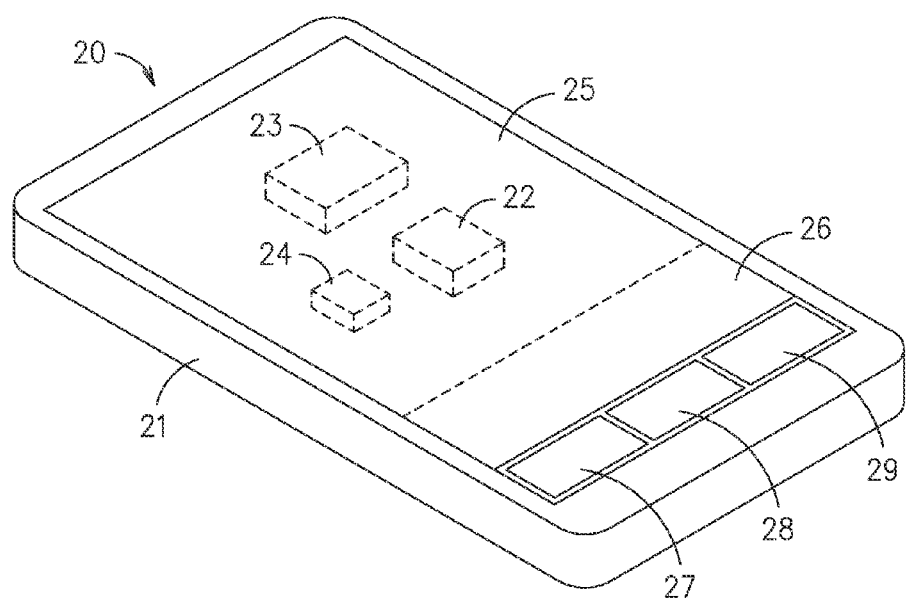
FIG. 1 is a schematic diagram showing an electronic apparatus according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
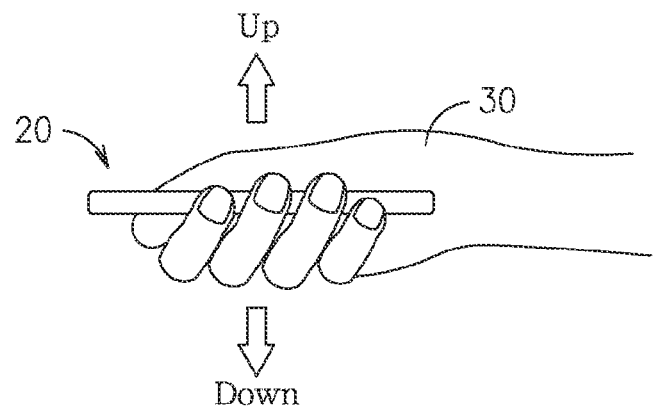
FIG. 2 is a schematic diagram showing the electronic apparatus of FIG. 1 that is held by a user so as to be moved upward and downward.
Figure 3:
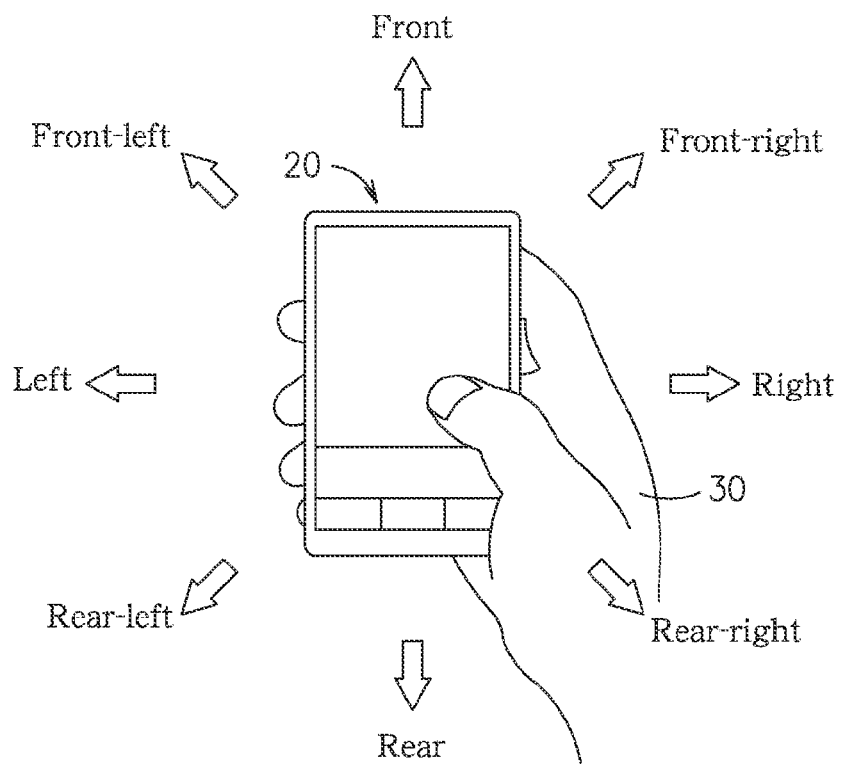
FIG. 3 is a schematic diagram showing the electronic apparatus of FIG. 1 that is held by a user so as to be moved in all eight directions including the front, the rear, the left, the right, the front left, the rear-left, the front-right and the front-left.

Please refer to FIG. 1, which is a schematic diagram showing an electronic apparatus according to an embodiment of the present disclosure. In FIG. 1, the electronic apparatus 20 is substantially a smart phone, but is not limited thereby and thus can be a PDA, a cellular phone or a tablet computer. In this embodiment, the electronic apparatus 20 comprises: a frame 21, an initial sensor 22, a processor 23, a vibrator 24, a touch screen 25, a pattern displaying zone 26, a first switch 27, a second switch 28 and a third switch 29, in which the initial sensor 22, the processor 23, the vibrator 24, the touch screen 25, the pattern displaying zone 26, the first switch 27, the second switch 28 and the third switch 29 are electrically connected to the frame 21. In addition, the first switch 27 is used for performing a retry command, the second switch 28 is used for performing a "go back" command, and the third switch 29 is used for performing a confirm command. The inertial sensor 22 can either be an accelerometer or a G-sensor; the touch screen 25 can detect the presence and location of a touch by a user for inputting commands; the pattern displaying zone 26 is a smaller and specific area of the touch screen 25, or can be a display being integrated into the touch screen 25. Operationally, when the electronic apparatus 20 is being held in a hand 30 of a user and moved thereby, the inertial sensor 22 is adapted for detecting the moving of the electronic apparatus 20 in a plurality of directions, including the upward, the downward, the front, the rear, the left, the right, the front left, the rear-left, the front-right and the front-left directions in view of the electronic apparatus at the first position, as shown in FIG. 2 and FIG. 3. In this embodiment, the electronic apparatus 20 with the inertial sensor 20 is able to perform an operation for setting a three-dimensional pattern, which is composed of a plurality of directional segments, to be used as a password for unlocking the electronic apparatus 20.

Figure 4:
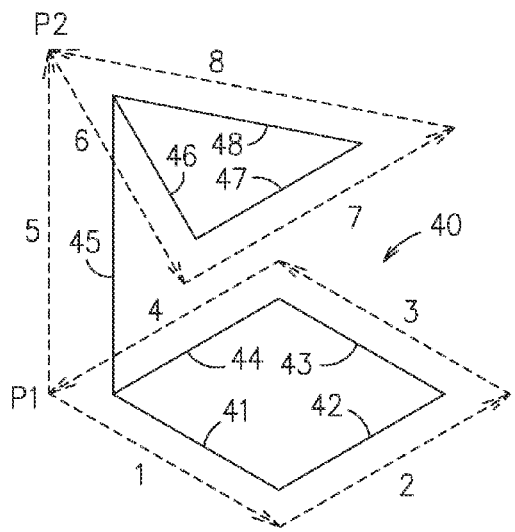
FIG. 4 is a schematic diagram showing a three-dimensional architecture used in an embodiment of the present disclosure.
Figure 5:
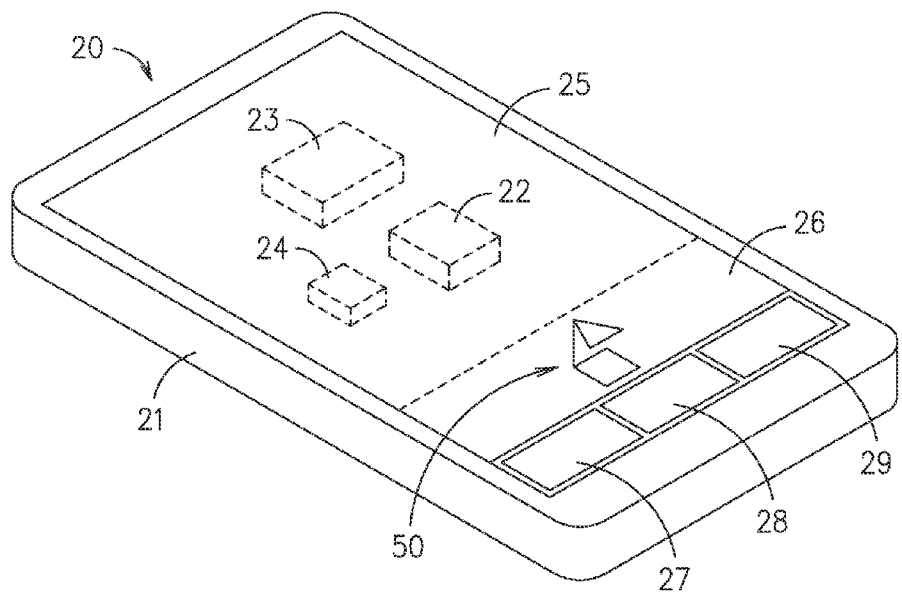
FIG. 5 is a schematic diagram showing how a graphical code can be displayed on an electronic apparatus according to an embodiment of the present disclosure.

As shown in FIG. 4 and FIG. 5, a three-dimensional pattern 40 composed of solid segments is provided according to the design of a user, which is composed of: a rectangle, that is disposed at the bottom of the three-dimensional pattern 40 and is composed of four segments 41-44; a triangle, disposed at the top of the three-dimensional pattern 40 and is composed of three segments 46-48; and a vertical segment 15, connecting the bottom rectangle to the top triangle. Operationally, a user can activate the electronic apparatus 20 for enabling the same to enter a code input mode simply by touching the touch screen 25 of the electronic apparatus 20. Thereafter, the electronic apparatus 20 in the code input mode will display a plurality of functions that can be selected on its touch screen 25, e.g. a code setting function. When the user is intended to set a unlocking password for the electronic apparatus 20, he/she can touch and select the icon of code setting function on the touch screen 25, and thereafter, the user can hold the electronic apparatus 20 and start to move the electronic apparatus in a trajectory forming the intended three-dimensional pattern 40 so as to input the three-dimensional pattern 40 into the electronic apparatus 20 to be used as a password of unlocking. The three-dimensional pattern 40 can be formed in various manners. One example is shown in FIG. 4, which shows a trajectory for moving the electronic apparatus 20 continuously from a first position P1 to a second position P2, whereas the first position P1 is the starting position while the second position P2 is the ending position of the three-dimensional pattern 40. As shown in FIG. 4, the electronic apparatus 20 that is designated to be located at the first position P1 is held and moved toward its rear direction following the dotted arrow 1, and then it is turned to move toward its right direction following the dotted arrow 2, and then it is turned again to move toward its front direction following the dotted arrow 3, and then it is turned again to move toward its left direction following the dotted arrow 4, and then it is turned again to move toward its upward direction following the dotted arrow 5, and then it is turned again to move toward its rear-left direction following the dotted arrow 6, and then it is turned again to move toward its right direction following the dotted arrow 7, and finally it is turned again to move toward its front-left direction following the dotted arrow 8 and reaching the second position P2. Thereby, the intended three-dimensional pattern 40 is accomplished and is ready to be used as the password for unlocking the electronic apparatus 20. It is noted that during the moving of the electronic apparatus 20 from the first position P1 to the second position P2, the resulting three-dimensional trajectory is detected by the inertial sensor 22, whereas each time the inertial sensor 22 detects that the moving direction of the electronic apparatus 20 is changed, the processor 23 will enable a direction change operation so as to start a new segment following the directional change detected by the inertial sensor 22 and also simultaneously display the new segment in the pattern display zone 26 of the electronic apparatus 20. Accordingly, as soon as the electronic apparatus 20 had accomplished the moving from the first position P1 to and stop at the second position P2, a complete three-dimensional pattern 50 can be displayed on the pattern display zone 26, as shown in FIG. 5, and if the that three-dimensional pattern 50 is shaped exactly the same as the intended three-dimensional pattern 40, the password input of the user is determined to be correct and thus the electronic apparatus is unlocked. Moreover, for preventing the unlocking pattern from being observed and obtained by any person with malicious intend, the user can selected not to displaying the three-dimensional pattern 50 in the pattern display zone 26, i.e. the displaying of the three-dimensional pattern 50 is optional and can be enabled/disabled by the user at will. In a condition that the so-accomplished three-dimensional pattern 50 is confirmed by the user to be used as the password for unlocking the electronic apparatus 20, the third switch 29 is being pressed and activated for confirming the trajectory of the three-dimensional pattern 50 is inputted into the electronic apparatus 20 as a password of standard movement trajectory for unlocking the electronic apparatus 20. It is noted that the inputted standard movement trajectory can be registered and stored either in the processor 23, or in a storage unit of the electronic apparatus 20. Moreover, before registering and storing the standard movement trajectory, the electronic apparatus 20 can be enabled to issue a signal of "confirm again", which is used for reminding the user to input the password again via the process of moving the electronic apparatus 20 following the same three-dimensional continuous trajectory so as to confirm the unlocking password again.

On the other hand, in a condition when an erroneous maneuver from the user causes certain mismatching between the achieved three-dimensional pattern 50 and the intended three-dimensional pattern 40, or the user decides that the achieved three-dimensional pattern 50 is not appropriated to be used as the password, the first switch 27 can be pressed for activating a retry command to stop the processing of the processor 23 and thereby initiating the inputting of the three-dimensional pattern 40 all over again.

In addition, if there is an erroneous segment being inputted due to a careless mistake of the user and therefore required to be modified, the second switch 28 pressed for activating a "go back" command to reset the trail of a previous movement, i.e. the erroneous segment is erased so as to proceed with the moving of a new trail in a correct direction. It is noted that the second switch 28 can be pressed for multiple time so as to correspondingly erase the same amount of segments that are already inputted sequentially just before the pressing of the second switch 28. That is, if the second switch 28 is being pressed twice, the two previous segments that are inputted just before and at the time when the second switch 28 is being pressed will be erased for allowing two new segments to be inputted sequentially as the replacement of the two previous segments.

Moreover, in an embodiment of the present disclosure, ach time the inertial sensor 22 detects that the moving direction of the electronic apparatus 20 is changed, the processor 23 will enable a color changing upon the three-dimensional pattern of the plural segments for enabling any two neighboring segments in the plural segments that are connected one after the other to have different colors. As shown in FIG. 4, the color of the segment resulting from the movement along the dotted arrow 1 is defined to be red, while the color of the segment resulting from the following movement along the dotted arrow 2 is defined to be green, and then the color of the segment resulting from the following movement along the dotted arrow 3 is defined to be red or a color other than green. Thereby, the user can clearly identify each direction change in the moving of the electronic apparatus 20. In addition, during the moving of the electronic apparatus 20, the electronic apparatus 20 is enabled to activate a vibrator arranged therein to issue one short vibration at each direction change of the electronic apparatus 20 so as to inform the user that one segment is complete and it's time and place to start another segment in another direction, whereas the short vibration can last about a second or two.

It is noted that the three-dimension pattern 40 shown in FIG. 4 can be formed in various ways and sequences according to the users' preference and habit, or starting the movement either at the first position or the second position. For instance, it can be formed by serially connected segments following the dotted arrows 6→7→8→5→1→2→3→4, or 8→7→6→5→4→3→2→1, or even 4→3→2→1→5→8→7→6. Nevertheless, once the sequence for constructing a three-dimension pattern for unlocking had been completed and registered, it had to be done and followed precisely so as to unlock the electronic apparatus 20. For instance, if initially a sequence of: 4→3→3→1→5→8→7→6 is used for constructing a three-dimension pattern for unlocking, the user will have to move the electronic apparatus 20 exactly following the sequence of 4→3→2→1→5→8→7→6 so as to successfully unlock the electronic apparatus 20. That is, if the same three-dimension pattern is constructed using a sequence different than the sequence of: 4→3→2→1→5→8→7→6, such as a sequence of: 6→7→8→5→1→2→3→4, or 8→7→6→5→4→3→2→1, the electronic apparatus 20 will not be unlocked.

In addition, for preventing the moving of the electronic apparatus to be photographed and obtained by any person with malicious intent, the process for forming a three-dimension pattern as unlocking password for the electronic apparatus 20 is designed to accept a certain numbers of false motion inputs. In an embodiment of the present disclosure, during the moving of the electronic apparatus 20, the vibrator 24 is being randomly enabled to issue at least one long vibration that lasts for a period of time longer than that of the at least one short vibration between 5 to 10 sec for instance; and during the lasting of each long vibration, the user is allowed to execute at least one false motion input to the electronic apparatus 20 for enabling the electronic apparatus 20 to move at least once in directions not included in the planed three-dimensional pattern 40; and also during the lasting of the long vibration, the inertial sensor 22 stops detecting the movement of the electronic apparatus and is enable to resume the detection after the long vibration as the electronic apparatus 20 is moving in directions as planed. The amount of long vibration as well as the lasting time thereof can be determined by the user at will without limitation, only if it is sufficient for the user to complete the false motion input and is frequent enough for confusing the person with malicious intent. Nevertheless, the aforesaid feedback and reminding functions of the short and long vibrations are optional, and thus can be selectively enabled by the user at will.

Operationally, after the moving of the electronic apparatus 20 for setting a password for unlocking the electronic apparatus 20 is completed by a user, the resulting trajectory of the moving of the electronic apparatus 20 will be registered as a standard movement trajectory in the electronic apparatus 20 and to be used as a screenlock password for the electronic apparatus 20, and then the touch screen 25 of the electronic apparatus 20 is locked. Thereafter, the electronic apparatus 20 is required to be unlocked before it can be used by the user, and for unlocking the electronic apparatus 20, the electronic apparatus 20 must be moved in a trajectory conforming to the registered standard movement trajectory. According to the embodiment shown in FIG. 4, for unlocking the electronic apparatus 20, a user will first tap the touch screen 25 of the electronic apparatus 20 for enabling a prompt box to display on the touch screen asking the user for input a password, and thereafter, the user can start moving the electronic apparatus in a continuous trajectory for constructing the three-dimensional pattern 40. In addition, during the inputting of the password into the electronic apparatus 20, i.e. during the moving of the electronic apparatus 20, the plural segments of the three-dimensional pattern 40 will be displayed in the pattern displaying zone 26 sequentially one after another, and eventually a completely three-dimensional pattern 50 can be displayed in the pattern displaying zone 26. As soon as the inputting of the three-dimensional pattern 50, the processor will be enabled to compare the trajectory of the three-dimensional pattern 50 with the registered standard movement trajectory; and if the sequence and shape of the trajectory inputted by the user match to those of the standard movement trajectory, the correctness of trajectory inputted by the user is authenticated and thus the electronic apparatus 20 is unlocked; otherwise, the authentication for unlocking will fail and the electronic apparatus 20 will remain locked.

Alternatively, also during the inputting of the password into the electronic apparatus 20, i.e. during the moving of the electronic apparatus 20, any direction change in the moving of the electronic apparatus 20 can be identified by the segment color variation, and thus any error in the movement can be detected easily in the moving process and correspondingly, the user can simply adjust the mistake by pressing the first switch 27 so as to enable a retry command to stop the processing of the processor 23 and start the password input from the beginning Nevertheless, at the same time that the vibrator 24 is also being activated for either issuing a short vibration in response to each direction change, or issuing a long vibration for prompting the user to perform a false motion input.

Figure 6:
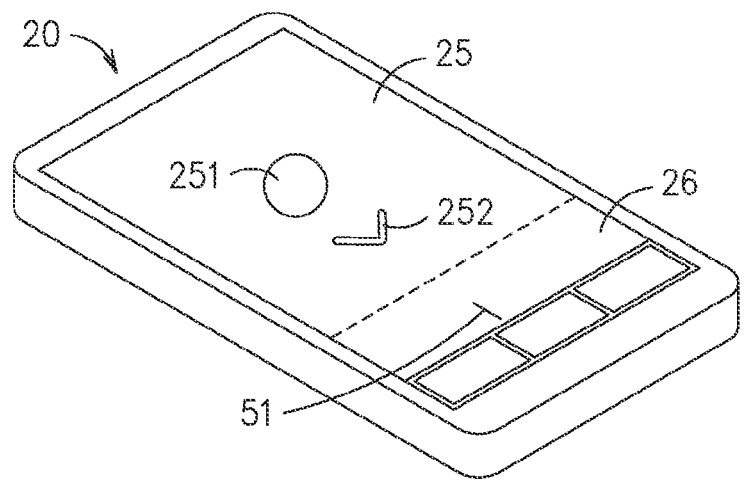
FIG. 6 to FIG. 9 are schematic diagrams showing how an electronic apparatus of the present disclosure is to indicate various moving directions in a step-by-step manner by the use of the combination of a ball figure and an arrow figure.
Figure 7:
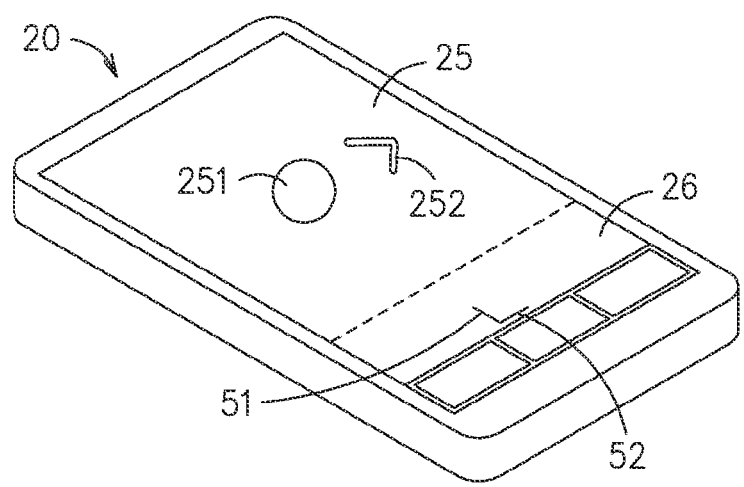
Figure 8:
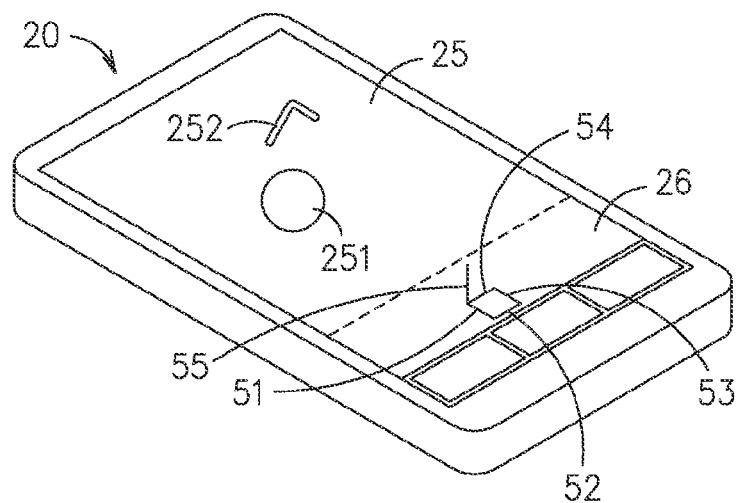
Figure 9:
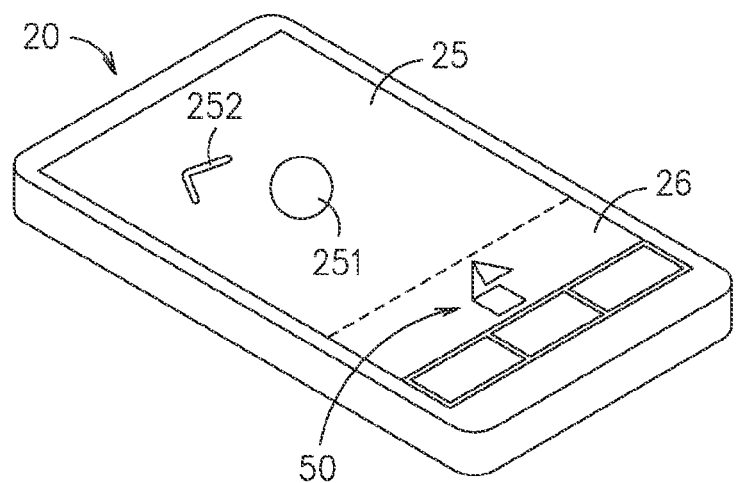

Please refer to FIG. 6 to FIG. 9, which are schematic diagrams showing how an electronic apparatus of the present disclosure is to indicate various moving directions in a step-by-step manner by the use of the combination of a ball figure and an arrow figure. As shown in FIG. 6 to FIG. 9, there are a combination of a ball figure 251 and an arrow figure 252 being displayed on the touch screen 25 of an electronic apparatus 20, that is to be used for indicating the moving direction of the electronic apparatus 20 in a manner that the arrow feature 252 is disposed on a circular orbit centering around the ball feature 251 and at a position on a side the ball feature 251 that indicates and is corresponding to the moving direction of the electronic apparatus 20 at each direction change during the moving of the electronic apparatus 20, and thus the moving direction of the electronic apparatus is indicated and corresponding to the pointing of the arrow feature 252. Taking the three-dimensional pattern 40 of FIG. 4 for example, while the electronic apparatus 20 is being moved by the user toward its rear for constructing the segment 41 in the three-dimensional pattern 40, the arrow figure 252 is correspondingly disposed at the rear side of the ball figure 251 and pointing toward the rear of the electronic apparatus 20, and simultaneously a segment 51 corresponding to the segment 41 of the three-dimensional pattern 40 is displayed in the pattern displaying zone 26, as shown in FIG. 6. Similarly, while the electronic apparatus 20 is being moved by the user toward its right for constructing the segment 42 in the three-dimensional pattern 40 after the segment 51 is completed, the arrow figure 252 is correspondingly disposed at the right side of the ball figure 251 and pointing toward the right of the electronic apparatus 20, and simultaneously a segment 52 corresponding to the segment 42 of the three-dimensional pattern 40 is displayed in the pattern displaying zone 26 along with the previous segment 51, as shown in FIG. 7. Thereafter, after the segments 43, 44 are completed the same way as the above description, the electronic apparatus 20 is being moved by the user upward for constructing the segment 45 in the three-dimensional pattern 40 after the segment 44 is completed, the arrow figure 252 is correspondingly disposed on top of the ball figure 251 and pointing upward, and simultaneously a segment 55 corresponding to the segment 45 of the three-dimensional pattern 40 is displayed in the pattern displaying zone 26 along with the previous segments 51-54, as shown in FIG. 8. Consequently, after the final segment 48 in the three-dimensional pattern 40 is completed by the moving of the electronic apparatus 20 toward it front-left direction, a complete three-dimensional pattern 50 can be achieved and displayed in the pattern displaying zone 26, as shown in FIG. 9. It is noted that after the three-dimensional pattern 50, the arrow figure. 252 is maintained pointing toward the front-left direction corresponding to the final segment 48. Moreover, at each direction change, in addition to changing the pointing and the positioning of the arrow figure 252, the colors of the ball figure 251 and the arrow figure 252 can be changed also at each direction change into a color different from those of the one-step-ahead direction change. For instance, when the colors of the ball figure 251 and the arrow figure 252 are red in FIG. 6, the colors of the ball figure 251 and the arrow figure 252 in the next step shown in FIG. 7 can be changed into blue, and so forth. Thereby, the user can easily recognize and identify each diction change.

In another embodiment, the electronic apparatus 20 can further be equipped with a reminding function, using that the electronic apparatus 20 is able to output a sound for informing the user the next moving direction for the electronic apparatus 20 after one previous segment is completed. That is, during the moving of the electronic apparatus 20, the electronic apparatus 20 is enabled to issue a sound at each time the inputting of one trail of the three-dimensional continuous trajectory is complete by the user for reminding the user by hearing about the direction of one next trail in the three-dimensional continuous trajectory that is to be inputted. It is noted that such reminding function is optional that can be activated or deactivated by the user at will.

Figure 10:
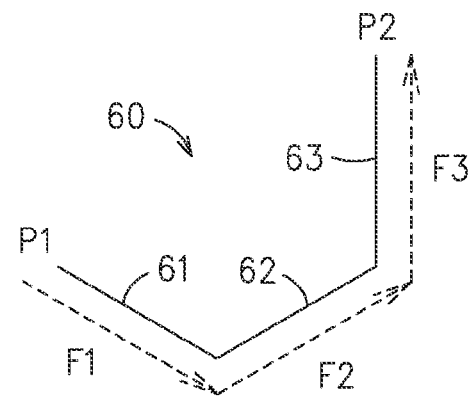
FIG. 10 is a schematic diagram showing a three-dimensional architecture used in another embodiment of the present disclosure.

The complexity of the screenlock password is designed and determined according to user requirement. For instance, the three-dimensional pattern 40 is the combination of eight segments 41-48 that are extending respectively in seven different directions, including rear, right, front, left, up, rear-left and front-left. Nevertheless, in another embodiment shown in FIG. 10, the three-dimensional pattern 60 is formed by the combination of a first segment 61, a second segment 62 and a third segment 63 that are extending in different directions, whereas the second segment 62 is connected to the first segment 61 and the third segment 63 respectively by two opposite ends thereof. In this embodiment, the first segment 61 is extending in a direction parallel to a first direction F1, the second segment 62 is extending in a direction parallel to a second direction F2, and the third segment 63 is extending in a direction parallel to a third direction F3, whereas the first direction F1 is orientated perpendicular to the second direction F2, forming a two-dimensional plane, and the third direction F3 is orientated perpendicular to the two-dimensional plane. That is, the first, second and third directions F1-F3 are basically three axes of a Cartesian coordination system. As shown in FIG. 10, the electronic apparatus 20 is first being located at a first position P1, i.e. the starting position of this three-dimensional pattern 60, and then the electronic apparatus 20 is move sequentially to its rear, right and then upward to reach a second position P2, by that the three-dimensional pattern 60 is completed. Comparing to the embodiment shown in FIG. 4, the embodiment of FIG. 10 is simpler, but still is a three-dimensional continuous trajectory.

From the above embodiments, it is noted that since the graphical password of the present disclosure is formed from the moving trajectory of the electronic apparatus according to the detection of an inertial sensor embedded inside the electronic apparatus, such graphical password can be fun and ease to memorized when it is being used as the screen lock of the electronic apparatus. In addition, since the graphical password of the present disclosure is not restricted to be a two-dimensional pattern and thus can be a three-dimensional pattern, the diversity of the graphical password of the present disclosure is improved comparing to those conventional the graphical password. Moreover, since the graphical password of the present disclosure is designed to be inputted into an electronic apparatus simply by moving the electronic apparatus in various directions so as to complete a specific three-dimensional continuous trajectory, the electronic apparatus is protected from smudge attack as there will be no grease trail on its touch screen that the user's fingers leave behind, and simultaneously, since the inputting of the graphical password of the present disclosure allows a number of false motion inputs to be executed randomly at any time during the moving of the electronic apparatus, the risk of shoulder surfing attack can be prevented effectively. Not to mention that the complexity of password combination is increased greatly. Comparatively, there are 389,112 different password combinations for a conventional 3×3 screenlock, but there can be 1,111,110,000 different password combinations for a screenlock of the present disclosure that only accounts for 4-9 moving directions. Therefore, the amount of screenlock enabled by the present disclosure is more than 2855.5 times the amount of any conventional screenlock; and with the increasing of complexity in screenlock password, the security of the electronic apparatus is increased.

Figure 11:
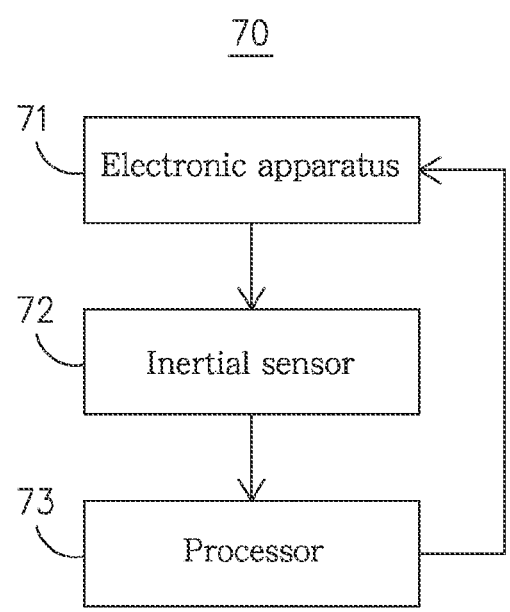
FIG. 11 is a block diagram showing an authentication system for electronic apparatuses according to an embodiment of the present disclosure.

Please refer to FIG. 11, which is a block diagram showing an authentication system for electronic apparatuses according to an embodiment of the present disclosure. As shown in FIG. 11, an authentication system 70 for electronic apparatus comprises: an electronic apparatus 71, an inertial sensor 72 and a processor 73. The electronic apparatus 71 can be a handheld device, such as a PDA, a cellular phone, a smart phone, a tablet computer, etc.; and operationally, the electronic apparatus 71 is held by a user so as to be moved from a first position to a second position. In addition, the inertial sensor 72, which can be an accelerometer or a G-sensor, is used for detecting and constructing a three-dimensional continuous trajectory of the electronic apparatus 71 as it is being moved from the first position to the second position, as those shown in FIG. 4 and FIG. 10. The processor 73 is used for processing the three-dimensional continuous trajectory so as to determine the correctness of the three-dimensional continuous trajectory so as to authenticate and unlock the electronic apparatus 71.

Please refer to FIG. 12, which is a flow chart depicting the steps performed in an authentication method for electronic apparatuses according to an embodiment of the present disclosure. The authentication method for electronic apparatuses of FIG. 12 comprises the steps of:

step 82: enabling an electronic apparatus to be moved by a user from a first position to a second position;

step 84: enabling an inertial sensor of the electronic apparatus to detect the moving of the electronic apparatus from the first position to the second position and thus constructing a three-dimensional continuous trajectory of the electronic apparatus's movement in a Cartesian coordination system composed of a first-direction axis, a second-direction axis and a third-direction axis as the three-dimensional continuous trajectory is composed of a plurality of trails oriented parallel respectively to the first-direction axis, the second-direction axis or the third-direction axis; and step 86: enabling a processor of the electronic apparatus to perform a comparison between the three-dimensional continuous trajectory and a previously registered standard movement trajectory so as to authenticate the correctness of the three-dimensional continuous trajectory and thus authenticating the electronic apparatus.

Please refer to FIG. 13, which is a flow chart depicting the steps performed in a code setting method for electronic apparatuses according to an embodiment of the present disclosure. As shown in FIG. 13, a code setting method 90 for electronic apparatuses comprising the steps of:

step 92: enabling an electronic apparatus to be moved by a user from a first position to a second position;

step 94: enabling an inertial sensor of the electronic apparatus to detect the moving of the electronic apparatus from the first position to the second position and thus constructing a three-dimensional continuous trajectory of the electronic apparatus's movement in a Cartesian coordination system composed of a first-direction axis, a second-direction axis and a third-direction axis as the three-dimensional continuous trajectory is composed of a plurality of trails oriented parallel respectively to the first-direction axis, the second-direction axis or the third-direction axis; and step 96: enabling a processor of the electronic apparatus to perform a process for registering the three-dimensional continuous trajectory in the electronic apparatus so as to be used as a standard movement trajectory.

Figure 14:
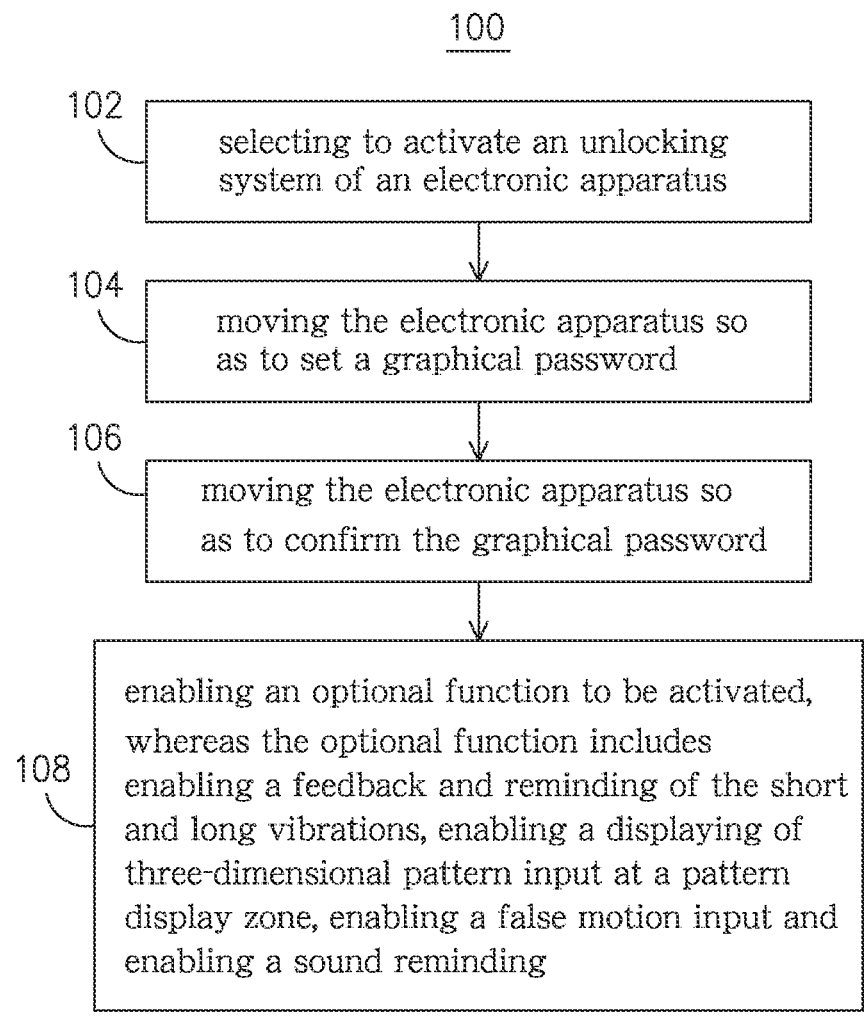
FIG. 14 is a flow chart depicting the steps for setting a graphical code on a cellular phone according to an embodiment of the present disclosure.

Please refer to FIG. 14, which is a flow chart depicting the steps for setting a graphical code on a cellular phone according to an embodiment of the present disclosure. As shown in FIG. 14, the code setting method 100 comprises the steps of:

step 102: enabling a user to activating an unlock system by touching a touch screen of an electronic apparatus so as to enable the electronic apparatus to enter a code input mode;

step 104: enabling the electronic apparatus to be moved by the user so as to allowing an inertial sensor to detect and construct a three-dimensional continuous trajectory during to the moving of the electronic apparatus;

step 106: enabling the electronic apparatus to prompt a chat icon of "confirm or not?" so as to acknowledging the user to perform again the previous code input process of moving the electronic apparatus in the three-dimensional continuous trajectory for confirming the three-dimensional continuous trajectory to be used as a graphical password for the electronic apparatus; and step 108: enabling an optional function to be activated, whereas the optional function includes enabling a feedback and reminding of the short and long vibrations, enabling a displaying of three-dimensional pattern input at a pattern displaying zone, enabling a false motion input and enabling a sound reminding.

It is noted that it is not required to have all the options in the optional function to be selected and activated at the same time, the user can determine at his/her own will to select which option to activate. For instance, if all the options are selected and the optional function are activated, there will be no long/short vibration being generated during the moving of the electronic apparatus, there will be no segment or pattern being display in the pattern displaying zone, there is not reminder for informing the user to perform a false motion input, and there will be no sound reminding for acknowledging the user which direction to move toward.

Figure 15:
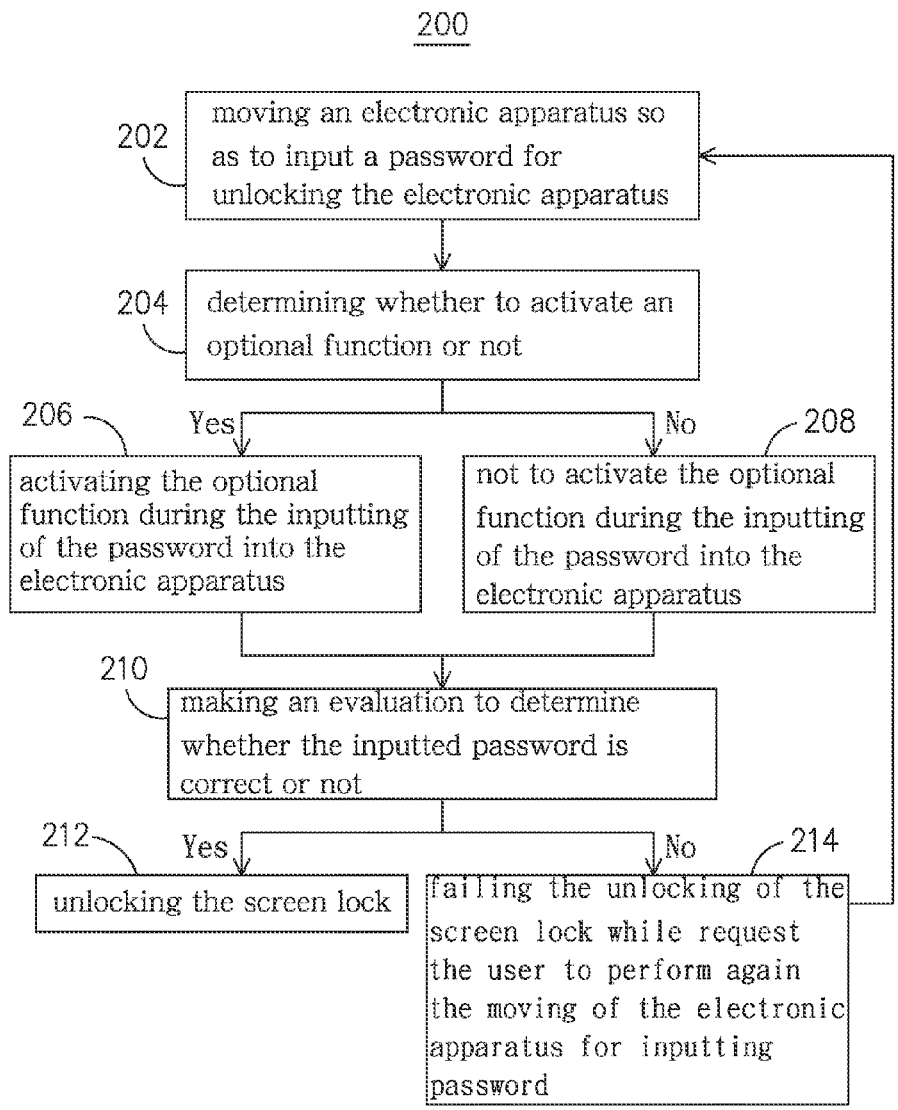
FIG. 15 is a flow chart depicting the steps for unlocking the screen lock of a cellular phone according to an embodiment of the present disclosure.

Please refer to FIG. 15, which is a flow chart depicting the steps for unlocking the screen lock of an electronic apparatus according to an embodiment of the present disclosure. As shown in FIG. 15, the method for unlocking the screen lock of an electronic apparatus comprises the steps of:

step 202: enabling the electronic apparatus to be moved by a user so as to allowing an inertial sensor to detect and construct a three-dimensional continuous trajectory during to the moving of the electronic apparatus, whereas the three-dimensional continuous trajectory is inputted into the electronic apparatus to be used as a password for unlocking the electronic apparatus;

step 204: determining whether to activate an optional function; and if so, the process proceeds to step 206, otherwise, the process proceeds to step 208;

step 206: activating the optional function during the inputting of the password into the electronic apparatus; step 208: not to activate the optional function during the inputting of the password into the electronic apparatus;

step 210: making an evaluation to determine whether the inputted password is correct or not according to a comparison perform by a processor of the electronic apparatus; and if correct, the process proceeds to step 212, otherwise, the process proceeds to step 214;

step 212: unlocking the screen lock of the electronic apparatus; and step 214: failing the unlocking of the screen lock while prompting a chat icon for acknowledging the user that the inputted password is incorrect and thus it is required to perform again the moving of the electronic apparatus for inputting password; and then the process proceeds back to step 202.

Obviously, the aforesaid embodiments of authentication methods not only can be adapted for smart phones with touch screen, but also they can be adapted for login authentication of different service system, such as the login authentication of a website or the login authentication of an operation system, etc. Operationally, a user is able to connect his/her smart phone to a login authentication system of a service either via a secure wired or wireless communication means and then perform one foregoing authentication method of the aforesaid embodiments so as to login to the service.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An authentication method for electronic apparatuses, comprising steps of:

enabling an electronic apparatus to be moved by a user from a first position to a second position;

enabling an inertial sensor of the electronic apparatus to detect the moving of the electronic apparatus from the first position to the second position and thus constructing a three-dimensional continuous trajectory of the electronic apparatus's movement in a Cartesian coordination system comprising a first-direction axis, a second-direction axis and a third-direction axis; and enabling a processor of the electronic apparatus to perform a comparison between the three-dimensional continuous trajectory and a previously registered standard movement trajectory so as to authenticate correctness of the three-dimensional continuous trajectory and thus authenticating the electronic apparatus, wherein the electronic apparatus further comprises a touch screen, for displaying a three-dimensional pattern resulting from processing of the three-dimensional continuous trajectory by the processor;

wherein the three-dimensional pattern comprises a plurality of segments, including a first segment, a second segment and a third segment; and wherein the first segment is extending in a direction parallel with the first-direction axis, the second segment is extending in a direction parallel with the second-direction axis, and the third segment is extending in a direction parallel with the third-direction axis, while the second segment is arranged to be connecting respectively to the first segment and the third segment by two opposite ends of the second segment.

2. The authentication method of claim 1, wherein each time the inertial sensor detects that a moving direction of the electronic apparatus is changed, the processor will enable a color changing upon the three-dimensional pattern of the plurality of segments for enabling any two neighboring segments in the plurality of segments that are connected one after the other to have different colors.

3. The authentication method of claim 1, wherein after the touch screen is touched by the user, the processor is activated for enabling the electronic apparatus to enter a code receiving mode, and thereby, the electronic apparatus is prepared to be moved by the user from the first position to the second position.

4. The authentication method of claim 1, wherein the touch screen has a pattern displaying zone to be used for displaying the three-dimensional pattern.

5. The authentication method of claim 1, wherein during the moving of the electronic apparatus, the touch screen is enabled to display a combination of a ball figure and an arrow figure while enabling the pointing of the arrow feature to indicate and correspond to a moving direction of the electronic apparatus.

6. The authentication method of claim 5, wherein the arrow feature is disposed on a circular orbit centering around the ball feature and at a position on a side of the ball feature that indicates and is corresponding to the moving direction of the electronic apparatus at each direction change during the moving of the electronic apparatus.

7. The authentication method of claim 1, wherein the inertial sensor is adapted for detecting the moving of the electronic apparatus in a plurality of directions, including upward, downward, front, rear, left, right, front left, rear-left, front-right and front-left directions in view of the electronic apparatus at the first position.

8. The authentication method of claim 1, wherein the electronic apparatus further comprises: a vibrator, capable of issuing at least one short vibration at each direction change of the electronic apparatus during the process of moving the electronic apparatus from the first position to the second position.

9. The authentication method of claim 8, wherein during the moving of the electronic apparatus from the first position to the second position, the vibrator is enabled to issue at least one long vibration that lasts for a period of time longer than that of the at least one short vibration; and during the lasting of the at least one long vibration, the user is allowed to execute at least one false motion input to the electronic apparatus for enabling the electronic apparatus to move at least once; and also during the lasting of the at least one long vibration, the inertial sensor stops detecting the movement of the electronic apparatus.

10. The authentication method of claim 1, wherein the electronic apparatus further comprises:
a first switch, electrically connected to the processor, used for performing a retry command to stop the processing of the processor;
a second switch, electrically connected to the processor, used for performing a "go back" command to reset a direction of at least one trail of the three-dimensional continuous trajectory; and
a third switch, electrically connected to the processor, used for performing a confirm command to confirm an inputting of the three-dimensional continuous trajectory.

11. The authentication method of claim 1, wherein during the moving of the electronic apparatus, the electronic apparatus is enabled to issue a sound at each time an inputting of one trail of the three-dimensional continuous trajectory is completed by the user for reminding the user by hearing about a direction of one next trail in the three-dimensional continuous trajectory that is to be inputted.

12. A code setting method for electronic apparatuses, comprising steps of:
enabling an electronic apparatus to be moved by a user from a first position to a second position;
enabling an inertial sensor of the electronic apparatus to detect the moving of the electronic apparatus from the first position to the second position and thus constructing a three-dimensional continuous trajectory of the electronic apparatus's movement in a Cartesian coordination system comprising a first-direction axis, a second-direction axis and a third-direction axis; and
enabling a processor of the electronic apparatus to perform a process for registering the three-dimensional continuous trajectory in the electronic apparatus so as to be used as a standard movement trajectory,
wherein the electronic apparatus further comprises a touch screen, for displaying a three-dimensional pattern resulting from processing of the three-dimensional continuous trajectory by the processor;
wherein the three-dimensional pattern comprises a plurality of segments, including a first segment, a second segment and a third segment; and
wherein the first segment is extending in a direction parallel with the first-direction axis, the second segment is extending in a direction parallel with the second-direction axis, and the third segment is extending in a direction parallel with the third-direction axis, while the second segment is arranged to be connecting respectively to the first segment and the third segment by two opposite ends of the second segment.

13. An authentication system for electronic apparatuses, comprising:
a frame, provided to be held by a user for allowing the user to move an electronic apparatus from a first position to a second position;
an inertial sensor, for detecting the moving of the electronic apparatus from the first position to the second position and thus constructing a three-dimensional continuous trajectory of the electronic apparatus's movement in a Cartesian coordination system comprising a first-direction axis, a second-direction axis and a third-direction axis;
a processor, for processing the three-dimensional continuous trajectory so as to determine correctness of the three-dimensional continuous trajectory; and
a touch screen, for displaying a three-dimensional pattern resulting from processing of the three-dimensional continuous trajectory by the processor,
wherein the three-dimensional pattern comprises a plurality of segments, including a first segment, a second segment and a third segment; and
wherein the first segment is extending in a direction parallel with the first-direction axis, the second segment is extending in a direction parallel with the second-direction axis, and the third segment is extending in a direction parallel with the third-direction axis, while the second segment is arranged to be connecting respectively to the first segment and the third segment by two opposite ends of the second segment.

14. A code setting method, comprising steps of:
selecting to activate an unlocking system of an electronic apparatus;
moving the electronic apparatus so as to set a graphical code;
enabling the electronic apparatus to move again so as to confirm the graphical code; and
enabling an optional function to be activated, wherein an inertial sensor of the electronic apparatus is configured to detect moving of the electronic apparatus and thus constructing a three-dimensional continuous trajectory of the electronic apparatus's movement in a Cartesian coordination system comprising a first-direction axis, a second-direction axis and a third-direction axis;

wherein the electronic apparatus further comprises a touch screen, for displaying a three-dimensional pattern resulting from processing of the three-dimensional continuous trajectory by a processor of the electronic apparatus;

wherein the three-dimensional pattern comprises a plurality of segments, including a first segment, a second segment and a third segment; and wherein the first segment is extending in a direction parallel with the first-direction axis, the second segment is extending in a direction parallel with the second-direction axis, and the third segment is extending in a direction parallel with the third-direction axis, while the second segment is arranged to be connecting respectively to the first segment and the third segment by two opposite ends of the second segment.

15. A method for unlocking a screenlock, comprising steps of:

enabling an electronic apparatus to move so as to input a graphical code for unlocking;

making an evaluation for determining whether to activate an optional function;

if the optional function is selected and determined to be activated, the optional function is activated during the inputting of the graphical code, otherwise, the optional function is not activated during the inputting of the graphical code;

making an evaluation for determining whether the inputted graphical code is correct, if so, a screen lock is unlocked, otherwise, a process for requesting a graphical code to be inputted is initiated, wherein an inertial sensor of the electronic apparatus is configured to detect moving of the electronic apparatus and thus constructing a three-dimensional continuous trajectory of the electronic apparatus's movement in a Cartesian coordination system comprising a first-direction axis, a second-direction axis and a third-direction axis;

wherein the electronic apparatus further comprises a touch screen, for displaying a three-dimensional pattern resulting from processing of the three-dimensional continuous trajectory by a processor of the electronic apparatus;

wherein the three-dimensional pattern comprises a plurality of segments, including a first segment, a second segment and a third segment; and wherein the first segment is extending in a direction parallel with the first-direction axis, the second segment is extending in a direction parallel with the second-direction axis, and the third segment is extending in a direction parallel with the third-direction axis, while the second segment is arranged to be connecting respectively to the first segment and the third segment by two opposite ends of the second segment.

\* \* \* \* \*